P. H. MARCIL.
VALVE OPERATING MEANS FOR INTERNAL COMBUSTION ENGINES.
APPLICATION FILED JULY 6, 1914.
1,174,748.
Patented Mar. 7, 1916.
3 SHEETS—SHEET 1.
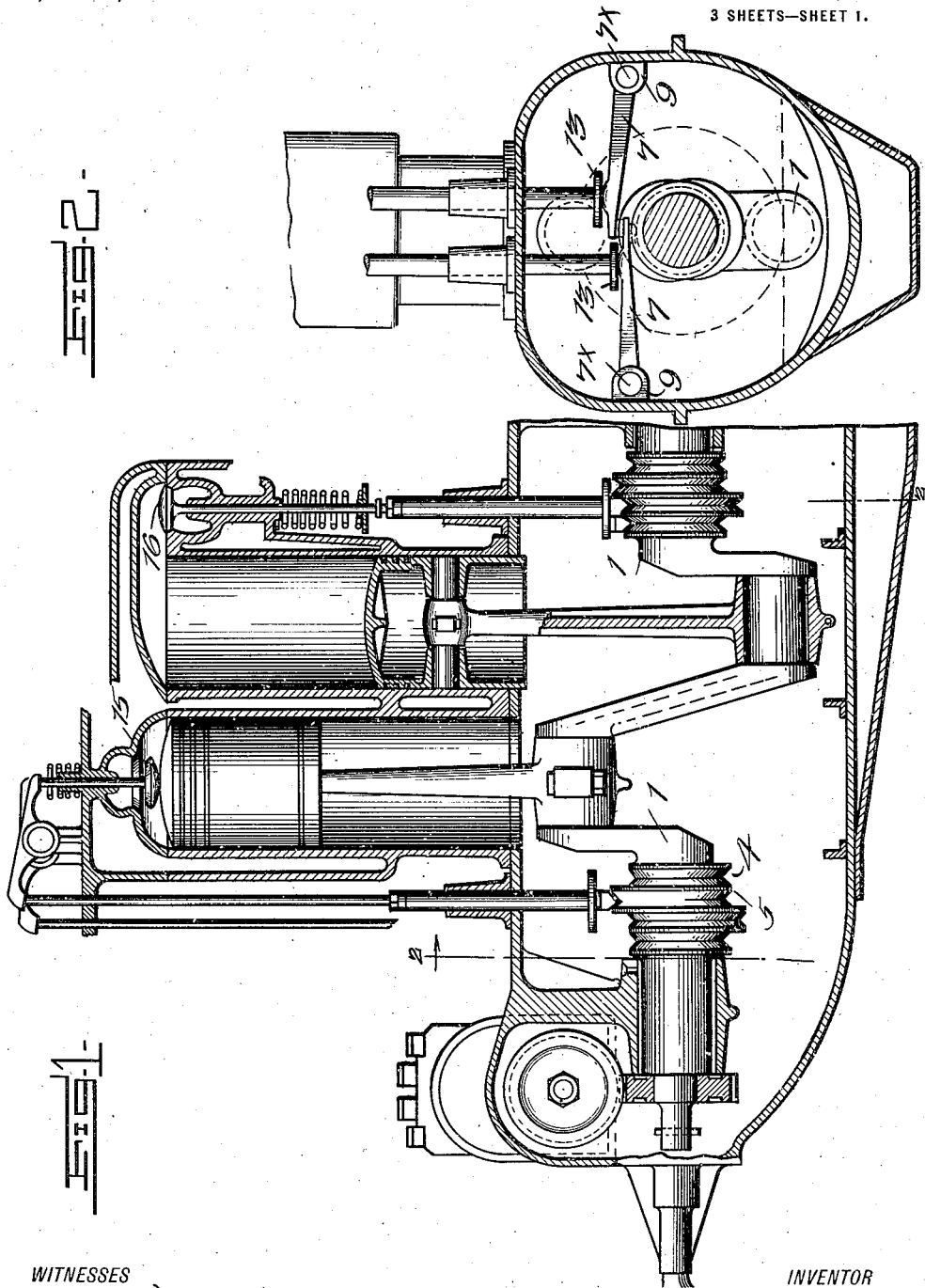
WITNESSES
INVENTOR
PHILIP H. MARCIL,
BY
ATTORNEYS P. H. MARCIL.
VALVE OPERATING MEANS FOR INTERNAL COMBUSTION ENGINES.
APPLICATION FILED JULY 6, 1914.
1,174,748.
Patented Mar. 7, 1916.
3 SHEETS—SHEET 2.
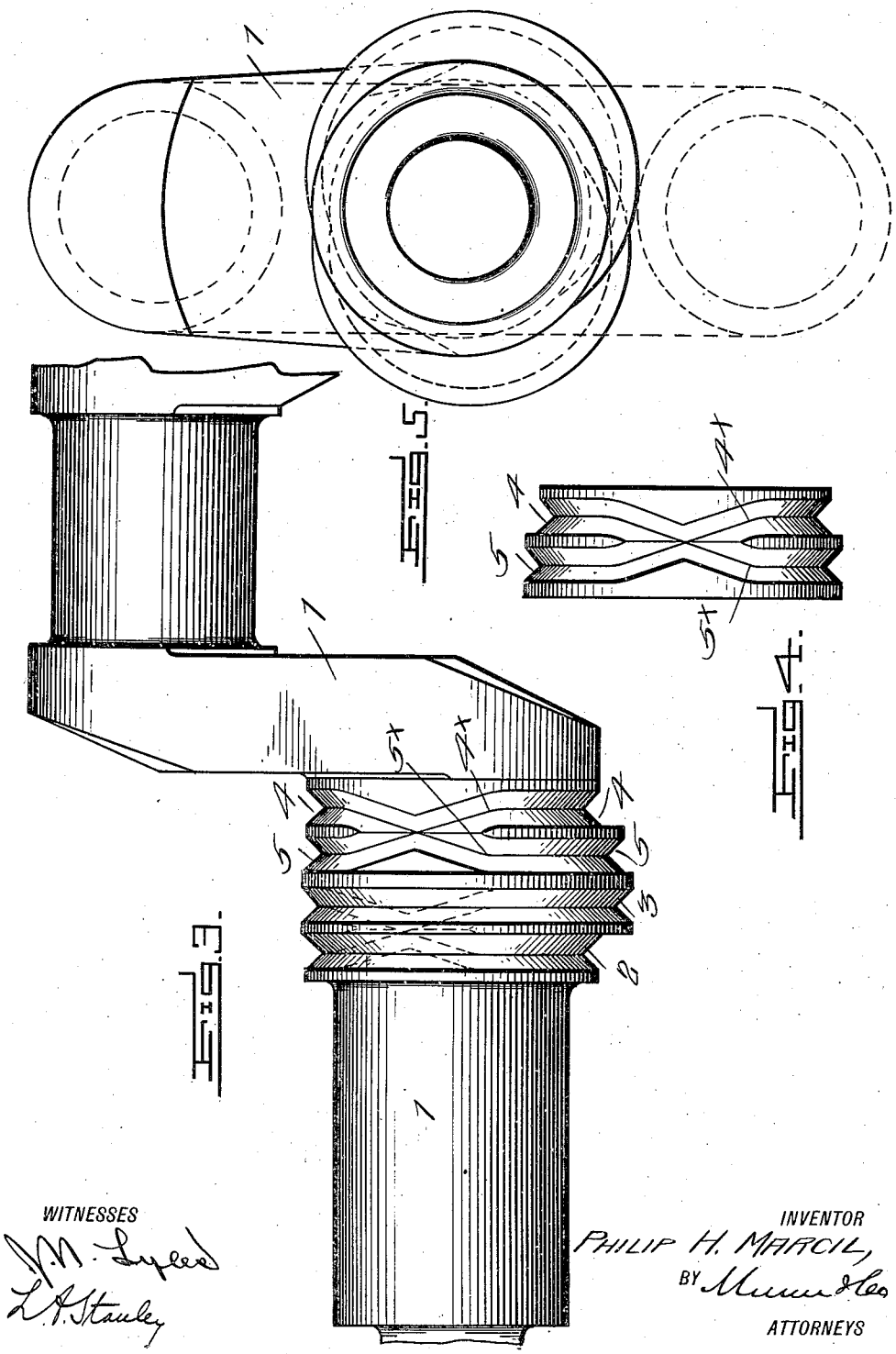
WITNESSES
INVENTOR
Philip H. Marcil,
BY
ATTORNEYS

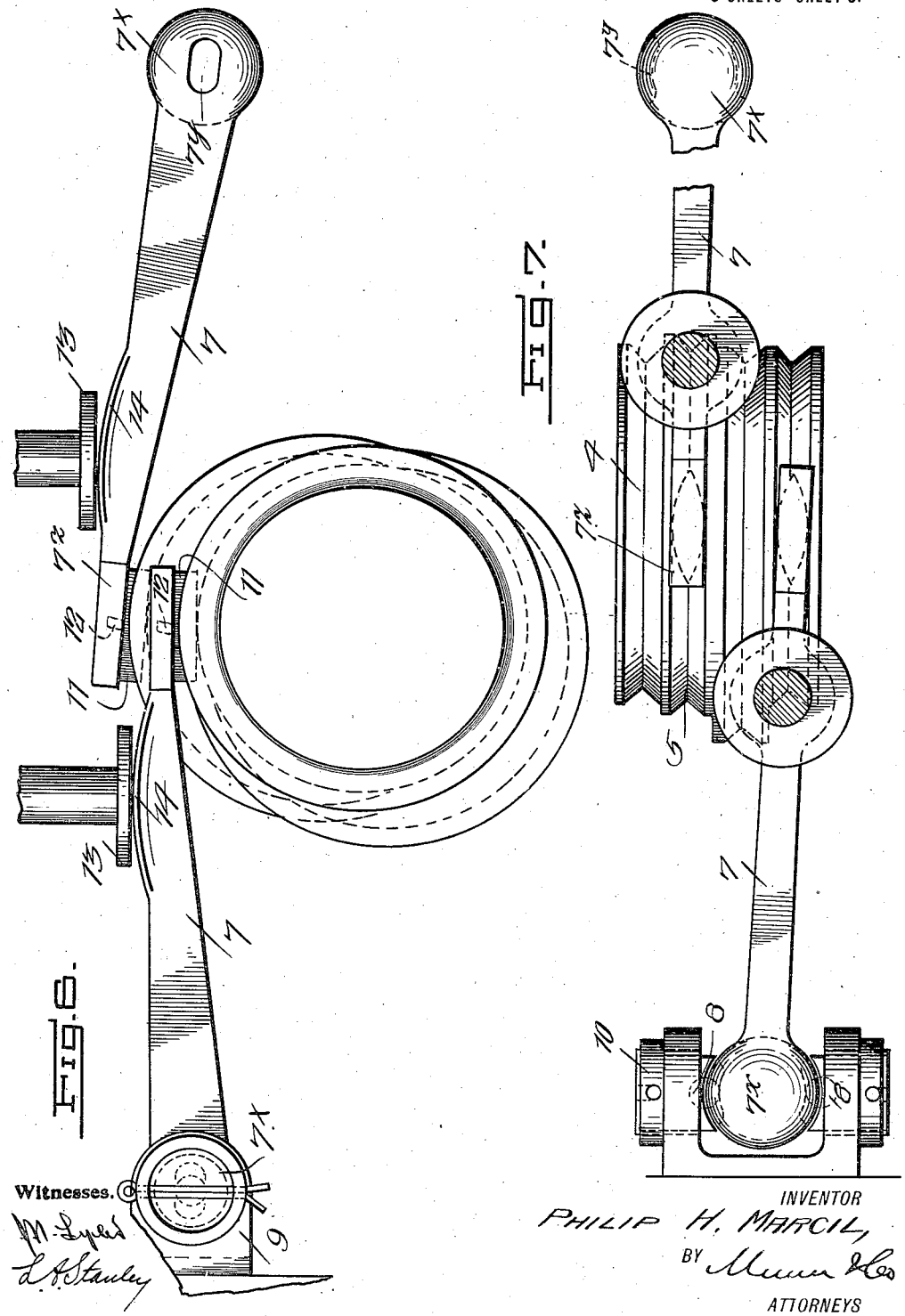

UNITED STATES PATENT OFFICE.

PHILIP H. MARCIL, OF DETROIT, MICHIGAN.

VALVE-OPERATING MEANS FOR INTERNAL-COMBUSTION ENGINES.

1,174,748. Specification of Letters Patent. Patented Mar. 7, 1916.

Application filed July 6, 1914. Serial No. 849,327.

*To all whom it may concern:*

Be it known that I, PHILIP H. MARCIL, a citizen of the United States, and a resident of Detroit, in the county of Wayne and State of Michigan, have made certain new and useful Improvements in Valve-Operating Means for Internal-Combustion Engines, of which the following is a specification.

My invention relates to improvements in valve operating means for internal combustion engines, and it consists in the constructions, combinations, and arrangements herein described and claimed.

An object of my invention is to provide means for operating the valves which will dispense with the ordinary extra shaft known as the cam shaft and of cross sprockets and chains for rotating the same.

A further object of my invention is to provide a valve operating means in which the valves are actuated by cams on the main crank shaft in such a manner that the valves are only operated at every other revolution of the crank shaft.

Other objects and advantages will appear in the following specification, and the novel features of the device will be particularly pointed out in the appended claims.

My invention is illustrated in the accompanying drawings forming part of this application in which—

Figure 1 is a sectional view through a portion of the engine showing the relation of the valves and the valve operating devices, Fig. 2 is a section along the line 2—2 of Fig. 1, Fig. 3 is an enlarged detail view of a portion of the crank shaft showing the cam grooves in one position, Fig. 4 is a detail view showing a set of cam grooves in another position, Fig. 5 is a diagrammatic view showing the relation of the eccentrics, Fig. 6 is an enlarged detail side view showing the follow levers and the cams for actuating the same, and Fig. 7 is a plan view of the parts shown in Fig. 6.

In carrying out my invention I make use of any suitable form of internal combustion engine such as a four-cylinder engine. In the drawings 1 denotes the crank shaft. At some convenient portion of the latter I mount cam members like those shown in Fig. 3. These cam members may be made an integral part of the shaft. In Fig. 3 I have shown a cam groove 2 which is concentric with the axis of the shaft 1, while immediately adjacent thereto is a cam groove 3, which is eccentric of the shaft 1. These two grooves 2 and 3 constitute a pair which actuates a single valve. The grooves 4 and 5 constitute a pair of cam grooves which actuate another valve. As will be seen from Fig. 3, the groove 4 at substantially a point $4^x$ bends to the left and merges with the groove 5, while the groove 5 at substantially a point $5^x$ bends to the right and merges with a groove 4. There is thus provided an endless cam groove for each valve extending twice around the shaft, part of this endless groove being concentric with the shaft and part eccentric.

In Fig. 6 I have shown two follower levers 7. Each of these follow levers is provided with a spherical head such as that shown at $7^x$ having an arc-shaped recess $7^y$ arranged to receive a portion of a ball 8. A bracket 9 is provided with arms arranged to receive a ball socket 10 which holds the ball 8. This construction permits the follow lever to have a swivel action. The opposite end of the follow lever 7 is flattened as shown at $7^z$ so as to rest on a follower shoe 11, the latter being designed to run in the channels or cam grooves. A pin 12 is rigidly carried by each follower shoe and extends loosely into an opening in the portion $7^z$ whereby the shoe is swiveled to the follower shoe 7. Valve lifters such as those shown at 13 are arranged to be engaged by curved contact portions 14 of the follower levers 7. In Fig. 1 I have shown two puppet valves 15 and 16 which are operated by the mechanism just described.

From the foregoing description of the various parts of the device the operation thereof may be readily understood.

As the crank shaft revolves the follower shoes are caused to traverse the cam grooves. These grooves are so arranged that the follower shoes will run around the grooves as the cam shaft is rotated. Thus in Figs. 1 and 3 when the follower is traversing the groove 4 the valve is stationary because the groove is concentric with the axis of the shaft 1, but when it passes over to the groove 5 then the valve is actuated because the groove 5 is eccentric. The follower shoe returns to the groove 4 at every other revolution of the shaft. The follower lever 7 is actuated by the eccentric cam so as to rise and fall and this causes the valve lifter 13 to rise and fall and thereby operate the valve.

It is obvious that the intake and exhaust valves or any other valves may operate in a similar manner. One important feature of this device is that it does away with the necessity of an auxiliary crank shaft and the necessary means such as chains, gears, or other transmission mechanism for operating the same. The valves are operated positively but only at every other revolution of the crank shaft.

I claim:

1. In a valve operating means for internal combustion engines, the combination with a crank shaft, of a pair of cam members carried thereby, one of said cam members being concentric with the main portion of the shaft, the other cam member being eccentric with respect to the main portion, each of said cam portions having a cam groove, the end of the groove on one cam member joining the end of the groove on the other cam, thereby forming one continuous groove, a rigid support comprising a pair of members each having a spherical recess and being provided with a groove, an arm provided with a ball-shaped end arranged to be held in the spherical recesses in said stationary support, and being provided with grooves, balls arranged to enter the grooves in said support and in said spherical-shaped head, a shoe pivotally carried at the opposite end of the arm and arranged to enter said continuous groove, and a valve lifter in continuous engagement with said arm.

2. In a valve operating means for internal combustion engines, the combination with a crank shaft, of a pair of cam members carried thereby, one of said cam members being concentric with the main portion of the shaft, the other cam member being eccentric with respect to the main portion, each of said cam portions having a cam groove, the end of the groove on one cam joining the end of the groove on the other, thereby forming one continuous groove, a rigid support comprising a pair of members each having a spherical recess and being provided with a groove, an arm having a curved contact portion and being provided with a ball-shaped end arranged to be held in the spherical recess in said stationary support, said arm also being provided with grooves, balls arranged to enter the grooves in said support and in said spherical-shaped head, a shoe pivotally carried at the opposite end of the arm and arranged to enter said continuous groove, and a valve lifter in continuous engagement with the curved contact portion of said arm.

PHILIP H. MARCIL.

Witnesses:
NOBLE GRENIER,
RAY DILL.